(12) United States Patent
Stempfer et al.

(10) Patent No.: US 11,134,559 B2
(45) Date of Patent: Sep. 28, 2021

(54) PLASMA TORCH SYSTEM

(71) Applicants: Ferdinand Stempfer, Aspersdorf (NO); Tom-Erik Falla, Jevnaker (NO); Brede Vigdal, Tyristrand (NO)

(72) Inventors: Ferdinand Stempfer, Aspersdorf (NO); Tom-Erik Falla, Jevnaker (NO); Brede Vigdal, Tyristrand (NO)

(73) Assignee: Norsk Titanium AS, Honefoss (NO)

( * ) Notice: Subject to any disclaimer, the term of this patent is extended or adjusted under 35 U.S.C. 154(b) by 238 days.

(21) Appl. No.: 16/019,424

(22) Filed: Jun. 26, 2018

(65) Prior Publication Data
US 2019/0014652 A1 Jan. 10, 2019

Related U.S. Application Data

(60) Provisional application No. 62/528,500, filed on Jul. 4, 2017.

(51) Int. Cl.
*B23K 10/00* (2006.01)
*H05H 1/28* (2006.01)
(Continued)

(52) U.S. Cl.
CPC ............ *H05H 1/28* (2013.01); *B23K 10/027* (2013.01); *H05H 1/26* (2013.01); *H05H 1/34* (2013.01);
(Continued)

(58) Field of Classification Search
CPC ... H05B 1/26; H05B 1/34; H05B 1/28; H05B 1/38; B23K 10/027
(Continued)

(56) References Cited

U.S. PATENT DOCUMENTS 3,147,329 A 9/1964 Gage
3,594,609 A * 7/1971 Vas .................. B05B 7/226
315/111.41

(Continued)

FOREIGN PATENT DOCUMENTS

| EP | 1245322 | 10/2002 |
| EP | 2691197 | 2/2014 |
| JP | 04059186 | 2/1992 |

OTHER PUBLICATIONS

Williams, S., "Large Scale Metal Wire + Arc Additive Manufacturing of Structural Engineering Parts," Welding Engineering and Laser Processing Centre, Cranfield University, www.waammat.com (Jul. 13, 2016), 25 pages.
Williams, S., "WAAMMat Programme Overview," Cranfield Manufacturing, www.cranfield.ac.uk (Jan. 2017), 19 pages.
Williams, S. and WAAMMat team, "Wire + Arc Additive Manufacture—Current and Future Developments," Welding Engineering and Laser Processing Centre, www.cranfield.ac.uk (Jun. 13, 2016), 37 pages.
(Continued)

*Primary Examiner* — Mark H Paschall
(74) *Attorney, Agent, or Firm* — Lee & Hayes, P.C.

(57) ABSTRACT

Provided is a fluid-cooled melting tool that can be used in methods and systems for manufacturing objects by additive manufacturing techniques, especially titanium and titanium alloy objects. In some configurations, the melting tool is configured to be a plasma transferred arc (PTA) torch and the deposition rate can be increased by increasing the flow rate of electric charge through the electrode made possible by the dual circuit cooling design of the torch. The fluid-cooled melting tools provided herein exhibit stable and repeatable PTA characteristics over wide range of current including current of 400 amps or more, whether pulsed or non-pulsed, and plasma gas flow inputs.

10 Claims, 5 Drawing Sheets

(51) Int. Cl.
  *B23K 10/02* (2006.01)
  *H05H 1/34* (2006.01)
  *H05H 1/38* (2006.01)
  *H05H 1/26* (2006.01)
  *B33Y 30/00* (2015.01)
  *B33Y 40/00* (2020.01)
  *B33Y 10/00* (2015.01)

(52) U.S. Cl.
  CPC ............... *H05H 1/38* (2013.01); *B33Y 10/00* (2014.12); *B33Y 30/00* (2014.12); *B33Y 40/00* (2014.12); *H05H 1/3421* (2021.05); *H05H 1/3447* (2021.05)

(58) Field of Classification Search
  USPC .............. 219/121.49, 121.48, 121.52, 121.5, 219/121.36
  See application file for complete search history.

(56) References Cited

U.S. PATENT DOCUMENTS

| | | | |
|---|---|---|---|
| 5,313,046 A | 5/1994 | Zamuner | |
| 6,395,197 B1* | 5/2002 | Detering | B01J 19/088 252/373 |
| 7,538,294 B2* | 5/2009 | Scotchmer | B23K 11/3009 219/119 |
| 2006/0049150 A1* | 3/2006 | Severance, Jr. | H05H 1/34 219/121.52 |
| 2006/0289406 A1* | 12/2006 | Helenius | H05H 1/34 219/121.48 |
| 2013/0305970 A1* | 11/2013 | Kim | F23G 7/065 110/235 |
| 2016/0107260 A1 | 4/2016 | Hughes | |
| 2016/0129531 A1 | 5/2016 | Hughes | |
| 2017/0182585 A1 | 6/2017 | Yamaguchi et al. | |

OTHER PUBLICATIONS

"Dabber with Pulsweld. Liburdi Automated Welding Systems," Liburdi Automation, Inc. (Aug. 23, 2011), 2 pages.
"LAWS 800. Liburdi Automated Welding Systems," Liburdi Automation, Inc. (Jul. 11, 2013), 4 pages.
"EB Job Shop Welding Services," Sciaky Inc., www.sciaky.com/patents (Dec. 15, 2015), 4 pages.
Brandl et al., "Additive manufactured Ti—6Al—4V using welding wire: comparison of laser and arc beam deposition and evaluation with respect to aerospace material specifications," Physics Procedia 5: 595-606 (2010).
McAndrew et al., "Interpass rolling of Ti—6Al—4V wire + arc additively manufactured features for microstructural refinement," Additive Manufacturing 21: 340-349 (Mar. 5, 2018).
Barroi et al., "Cladding and Additive Layer Manufacturing with a laser supported arc process," Laser Zentrum Hannover e.V., Hannover, 30419, Germany: 164-174 (Aug. 17, 2011).
Martina, F. and S. Williams, "Wire + arc additive manufacturing vs. traditional machining from solid: a cost comparison," Welding Engineering and Laser Processing Centre, Version 1.0 (Apr. 22, 2015), 27 pages.
Alexandrov et al., "Use of Plasma Arc Welding Process to Combat Hydrogen Metallic Disbonding of Austenitic Stainless Steel Claddings," Welding Research Supplement: 506-s to 516-s (Nov. 1993).
"Plasma Spotwelding Gun Manual. S197 Ford Mustang Bumper Welding Cell," Arc Kinetics LLC, Pullman Industries (2003), 16 pages.
Partial Search Report of European Patent Office in Appl'n No. PCT/EP2018/067443, dated Oct. 17, 2018.
International Search Report and the Written Opinion of PCT/EP2018/067443, dated Dec. 12, 2018.

* cited by examiner

PLASMA TORCH SYSTEM

RELATED APPLICATIONS

Benefit of priority is claimed to U.S. Provisional Application No. 62/528,500, titled "PLASMA TORCH SYSTEM," filed Jul. 4, 2017, the subject matter of which is incorporated by reference herein in its entirety.

FIELD OF THE INVENTION

The present relates to a melting tool, such as a plasma torch, and melting tool systems for manufacturing objects by additive manufacturing, especially for additive manufacture of titanium and titanium alloy objects.

BACKGROUND OF THE INVENTION

Structured metal parts made of titanium or titanium alloys are conventionally made by casting, forging or machining from a billet. These techniques have a number of disadvantages, such as high material use of the expensive titanium metal and large lead times in the fabrication of the metal object. Casting, which often can be used for production of a potentially near-net-shape object, typically has a reduced material quality due to lack of control of solidification and cooling rates. Tooling costs and the inability to prepare objects with complex shapes are additional disadvantages of the conventional methods.

Fully dense physical objects can be made by a manufacturing technology known as rapid prototyping, rapid manufacturing, layered manufacturing or additive manufacture. This technique uses design software, such as computer aided design (CAD) software, to construct a virtual model of the object which is to be made, and then transforms the virtual model into thin parallel slices or layers, usually horizontally oriented. The physical object can then be made by laying down successive layers of raw material until the entire object is formed. Additive manufacturing offers great fabrication freedom and potential cost-savings due to the layered build-up of near-net-shape products. Additive manufacturing allows fabrication of objects of almost any shape at relatively fast production rates, typically varying from some hours to several days for each object.

The technique of additive manufacturing allows forming metallic objects by using a welding technique that melts a metallic wire onto a substrate in successive stripes forming each layer according to the virtual layered model of the object, and repeating the process for each layer until the entire physical object is formed. The accuracy of the welding technique is usually too coarse to allow directly forming the object with acceptable dimensions. The formed object will thus usually be considered a green object or pre-form which needs to be machined to acceptable dimensional accuracy.

Using a titanium-inert gas (TIG)-welding torch to build objects by additive manufacturing are known (e.g., see Adams, U.S. Pat. Pub. No. 2010/0193480; and Withers et al. (U.S. Pat. Pub. No. 2006/185473)). In these methods, a plasma stream is created by energizing a flowing gas using an arc electrode, the arc electrode having a variable magnitude current supplied thereto. The electric arc can be provided by gas metal arc welding using the metal feedstock as an electrode. The metal of the consumable electrode is melted at the end in the plasma stream and the molten metal is deposited by positioning the end over the deposition point. The required heat for melting the consumable electrode is supplied by an electric arc expanding between the tip of the electrode and the workpiece/deposition substrate. Welding by melting a consumable electrode heated by an electric arc is known as gas metal arc welding (GMAW), of which in the case of using non-reactive gases to make the arc is also denoted as metal inert gas welding (MIG-welding).

A problem to be addressed is the speed of deposition of material on the base material to form the workpiece. One could increase the flow rate of electric charge through the electrode (amperes of current) of the torch. Use of high current, however, can produce a number of problems. If the change in current is not controlled, a rapid overheating of the electrode can occur, which can potentially damage the workpiece of the equipment itself.

The problems that can result from use of high currents can result in the need for frequent replacement of electrodes and, in worst case scenarios, cleaning of the welding apparatus. Replacement of the electrode and/or cleaning of the apparatus requires shutting down the apparatus, halting production. This is expensive and negatively impacts productivity. Existing melting tools exhibit a limited current work range particularly at 100% duty cycle, and can have arc instability as current varies. The low cooling capacity of conventional melting tools limits the duration of continuous operation, as operations typically have to cease in order for the equipment to dissipate thermal energy. This results in considerable down time, and overheating can result in high maintenance. In combination, these problems result in low deposition rates and low productivity.

Thus, there exists a need in this art for an improved melting tool for additive manufacturing that addresses the overheating problem conventionally observed at high current usage and other problems, and that can be used in an economical method of performing direct metal deposition in an additive manufacturing process at an increased rate of metal deposition.

SUMMARY OF THE INVENTION

An objective of the present invention is to provide a fluid-cooled melting tool that allows increased throughput and yield of products produced using additive manufacturing without the risk of overheating. Another objective is to provide a fluid-cooled melting tool for use in additive manufacturing processes that can utilize high electric current. Provided herein are fluid-cooled melting tools that include a dual circuit cooling design. The fluid-cooled melting tools provided herein can handle electric current of 400 amps or more. The fluid-cooled melting tools provided herein exhibit stable and repeatable plasma transferred arc (PTA) characteristics over a wide range of current, including current of 400 amps or more, whether pulsed or non-pulsed, and over varying plasma gas flow inputs. The fluid-cooled melting tools provided herein have a slim design that allows multiple melting tools to be used in combination, such as in a two torch or multi-torch system. The fluid-cooled melting tools have a current capacity of 400 amps or more at 100% duty cycle and produce a stable arc at high current. Because of the arrangement of the cooling circuits, the fluid-cooled melting tools provided herein allow for change of consumables without loss of cooling fluid.

Another objective of the invention is to provide methods for additive manufacturing of objects in titanium or titanium alloys using the fluid-cooled melting tools provided herein. Also provided are systems for additive manufacturing of objects in titanium or titanium alloys using the fluid-cooled melting tools provided herein.

This invention addresses the needs for an improved melting tool that can reliably be used for extended periods without overheating. The fluid-cooled melting tools provided herein can be a GWAW torch, or a MIG-welding torch, or a TIG-welding torch, or a PAW torch or a PTA torch, any of which includes a melter that generates plasma to provide thermal energy to a feedstock to melt the feed stock into molten metal that can be deposited on a base material. The melting tool can be an electron beam torch in which an electron beam is used as a melter to provide thermal energy to a feedstock to melt the feed stock into molten metal that can be deposited on a base material. The melting tool can be a laser torch in which a laser beam is used as a melter to provide thermal energy to a feedstock to melt the feed stock into molten metal that can be deposited on a base material.

Electron beam melters are known in the art (e.g., see Taminger and Hafley ("*Characterization of 2219 Aluminum Produced by Electron Beam Freeform Fabrication*," Presented at the 13$^{th}$ Solid Freeform Fabrication Symposium, Aug. 5-7, 2002, Austin, Tex.; In proceedings, University of Texas at Austin (2002); Taminger and Hafley ("*Electron Beam Freeform Fabrication: A Rapid Metal Deposition Process*," Proceedings of the 3$^{rd}$ Annual Automotive Composites Conference, Sep. 9-10, 2003, Troy, Mich., Society of Plastics Engineers (2003); and Taminger and Hafley ("*Electron Beam Freeform Fabrication for Cost Effective Near-Net Shape Manufacturing*", NATO/RTOAVT-139 Specialists' Meeting on Cost Effective Manufacture via Net Shape Processing (Amsterdam, the Netherlands, 2006) (NATO). pages 9-25)). The electron beam process involves feeding a metal wire into a molten pool made and sustained by a focused electron beam in a high vacuum environment.

Laser melters also are known in the art (see, e.g., U.S. Pat. No. 4,863,538 (Deckard, 1989) and U.S. Pat. No. 5,578,227 (Rabinovich, 1993). The laser device generates a laser beam of sufficient energy to transfer thermal energy to the feedstock to melt it into molten metal or to fuse metal powder particles together. Examples of suitable laser devices include a ytterbium (Yb) laser, a Yb fiber laser, a Yb fiber coupled diode laser, a Yb:glass laser, a diode-pumped Yb:YAG laser, a neodymium-doped yttrium aluminum garnet (Nd:YAG) laser, a $CO_2$ laser, a CO laser, a Nd:glass laser, a neodymium-doped yttrium orthovanadate (Nd:YVO) laser, a Cr:ruby laser, a diode laser, a diode pumped laser, an excimer laser, a gas laser, a semiconductor laser, a solid-state laser, a dye laser, an X-ray laser, a free-electron laser, an ion laser, a gas mixture laser, a chemical laser, and combinations thereof. Preferred lasers include Yb lasers, particularly Yb fiber lasers. In many applications, the wavelength used in a Yb fiber laser can be less reflective compared to other laser wavelengths.

This invention also addresses the need for an improved melting tool that can reliably handle electric current of 400 amps or more without overheating. This invention further addresses the need for a method of increasing throughput and yield of objects produced via additive manufacturing, where the parts exhibit smooth, well-defined deposition boundaries.

The fluid-cooled melting tools provided herein can be PTA torches, and can increase the deposition rate of metallic material during an additive manufacturing process by supplying the consumable electrode in the form of a wire, using a relatively high flow rate of electric charge in the electrode of the torch, and cooling the melting tool with the dual circuit fluid cooling system. The fluid cooling system incorporates cooling channels into the melting tool. The cooling channels can be positioned close to where the heat is being generated in order to remove thermal energy from the melting tool. In some embodiments, the cooling channels are located in sufficient proximity to the electrode or nozzle or jacket or any combination thereof to allow rapid transfer of thermal energy to the cooling channels and out of the melting tool to prevent overheating of the melting tool. The melting tools provided herein include a dual channel cooling design, where one channel cools the electrode and/or nozzle, and another channel cools the jacket of the melting tool.

Also provided are methods for manufacturing a three-dimensional object of a metallic material by additive manufacturing, where the methods include depositing successive deposits of a metallic material onto a base material. The molten metallic material is produced with a fluid-cooled melting tool provided herein. The melting tool can be a GWAW torch, an MIG-welding torch, a TIG-welding torch, a PAW torch or a PTA torch. The melting tool can be an electron beam torch or a laser torch. In some applications, the melting tool is a PTA torch that produces a plasma transferred arc that melts a consumable electrode positioned above a target deposition area to form a melted metal, and the melted metal is deposited to form the deposit of metallic material. Successive deposits form the near-net shape object.

In some applications, multiple melting tools can be used in combination. For example, a two torch system can be used, in which two melting tools are used in combination. In such methods, each successive deposit can be obtained by using a first fluid-cooled torch to produce a PTA to preheat a base material, or to form a molten pool in the base material, or both, at the position at which the metallic material is to be deposited. A consumable electrode in the form of a metal wire is delivered to a position above the preheated area or molten pool. A second fluid-cooled torch that produces a PTA heats and melts the wire such that molten metallic material drips into the preheated area or molten pool. The base material is moved relative to the position of the first and second PTA in a predetermined pattern such that the successive deposits of molten metallic material solidifies and forms the near-net shape three-dimensional object. In the methods provided, the fluid cooled melting tool includes a cooling system can include a coolant inlet connectable to be in fluid communication with a coolant supply inlet; an incoming coolant channel connected to and in fluid communication with the coolant inlet; an outgoing coolant channel connected to and in fluid communication with the incoming coolant channel; and a coolant outlet connected to and in fluid communication with the outgoing coolant channel.

In some embodiments of the two gun welding system, the system includes a laser torch for pre-heating the target deposition area on the base material to form a preheated area, and a plasma transferred arc torch for heating and melting a consumable electrode into the preheated area. In some embodiments of the two gun welding system, the system includes a plasma transferred arc torch for preheating the target deposition area on the base material to form a preheated area, and a laser torch for heating and melting a consumable electrode into the preheated area. In some embodiments of the two gun welding system, the system includes a laser torch for pre-heating the target deposition area on the base material to form a preheated area, and a laser torch for heating and melting a consumable electrode into the preheated area.

In some embodiments of the two gun welding system, the system includes a plasma transferred arc torch for preheating the target deposition area on the base material to form a preheated area, and an electron beam torch for heating and melting a consumable electrode into the preheated area. In some embodiments of the two gun welding system, the system includes an electron beam torch for pre-heating the target deposition area on the base material to form a preheated area, and a plasma transferred arc torch for heating and melting a consumable electrode into the preheated area. In some embodiments of the two gun welding system, the system includes an electron beam torch for pre-heating the target deposition area on the base material to form a preheated area, and an electron beam torch for heating and melting a consumable electrode into the preheated area.

The fluid-cooled melting tools provided herein containing a dual circuit cooling design can be configured to have a slim design. The slim design means that melting tool requires very little space and is therefore much easier to install, especially if more than one melting tool is used in the system, such as in a two torch additive manufacturing system. The dual circuit cooling design produces a stable arc over a wide current working range, such as from about 10 A to about 400 A. Because of the configuration of the dual circuit cooling design in relation to the arrangement of the consumables (e.g., the electrode or nozzle), the consumables readily can be changed without loss of cooling fluid from the cooling circuits.

Also provided are systems for manufacturing a three-dimensional object of a metallic material by additive manufacture. The systems can include a first fluid-cooled welding torch for preheating or forming a molten pool or both in a base material at a position at which the metallic material is to be deposited; a guiding element for guiding a consumable electrode (such as a metal wire) into position above the preheated area or molten pool; an electric contact unit in electrical connection with the consumable electrode to provide a current of 200-400 amps or more to the consumable electrode to preheat the consumable electrode; a second fluid-cooled welding torch that forms an arc to melt the consumable electrode into the preheated area or molten pool; a system for positioning and moving the base unit relative to the first and second welding torches; and a control system able to read a design model of the object which is to be formed and employ the design model to regulate the position and movement of the system for positioning and moving the substrate and to operate the welding torches such that a physical object is built by depositing and fusing successive deposits of the molten metallic material onto the base material.

Additional features and advantages of the invention will be set forth in the description which follows, and in part will be apparent from the description, or can be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

A. Definitions

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

As used here, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where the event or circumstance occurs and instances where it does not. For example, an optional component in a system means that the component may be present or may not be present in the system.

As used herein, the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term "wire guide" refers to the element that guides a metal wire as a feedstock.

As used herein, the term "electric contact unit" refers to the element that electrically connects to a metal wire feedstock used as a consumable electrode, such as in in a MIG- or TIG- or PTA-welding operation.

As used herein, a "combination" refers to any association between two items or among more than two items. The association can be spatial or refer to the use of the two or more items for a common purpose.

The term "plasma transferred arc torch" or "PTA torch" as used interchangeably herein refers to any device able to heat and excite a stream of inert gas to plasma by an electric arc discharge and then transfer the flow of plasma gas including the electric arc out through an orifice (such as a nozzle) to form a constricted plume that extends out of the orifice and transfers the intense heat of the arc to a target region. The electrode and target region can be electrically connected to a direct current power source such that the electrode of the PTA torch becomes the cathode and the target region becomes the anode. This will ensure that the plasma plume including electric arc is delivering a highly concentrated heat flow to a small surface area of the target region with excellent control of the areal extension and magnitude of the heat flux being supplied from the PTA torch. A plasma transferred arc has the advantage of providing stable and consistent arcs with little wandering and good tolerance for length deviations between the cathode and anode. Thus, the PTA torch is suitable both for heating the base material, e.g., to melt at least a portion thereof or to form a molten pool in the base material, as well as to heat and melt the metallic wire feed. The PTA torch may advantageously have an electrode made of tungsten and a nozzle made of copper. However, the invention is not tied to any specific choice or type of PTA torch. Any known or conceivable device able to function as PTA torch providing a stable heat source for melting the metal electrode wire can be used.

As used herein, a "Plasma Arc Welding torch" or "PAW torch" refers to a welding torch that can be used in plasma arc welding. The torch is designed so that a gas can be heated to a high temperature to form plasma and becomes electrically conductive, the plasma then transfers an electric arc to a workpiece, and the intense heat of the arc can melt metal and/or fuse two pieces of metal together. A PAW torch can include a nozzle for constricting the arc thereby increasing the power density of the arc. The plasma gas typically is argon. Plasma gas can be fed along an electrode and ionized and accelerated in the vicinity of a cathode. The arc can be directed towards the workpiece and is more stable than a free burning arc (such as in a TIG torch). The PAW torch also typically has an outer nozzle for providing a shielding gas. The shielding gas can be argon, helium or combinations thereof, and the shielding gas assists minimizing oxidation of the molten metal. Current typically is up to 400 A, and voltage typically is in the range of about 25-35 V (but can be up to about 14 kW). PAW torches include plasma transferred arc torches.

The term "metallic material" as used herein refers to any known or conceivable metal or metal alloy which can be formed into a wire and employed in a solid freeform fabrication process to form a three-dimensional object. Examples of suitable materials include, but are not limited to; titanium and titanium alloys such as i.e. Ti-6Al-4V alloys.

As used herein, "feedstock" refers to the metal to be welted to form the workpiece. The feedstock can be a metal wire, a metal powder, or combinations thereof.

As used herein, a "melter" refers to a device that supplies thermal energy to a feedstock to melt the feedstock into molten metal or provides thermal energy to a surface of a base material to preheat the base material. The melter can produced a plasma arc, a laser beam or an electron beam that is a source of the thermal energy.

The term "base material" as used herein refers to the target material for accepting molten metal. This will be the holding substrate when depositing the first layer of metallic material. When one or more layers of metallic material have been deposited onto the holding substrate, the base material will be the upper layer of deposited metallic material that is to have deposited a new layer of metallic material.

As used herein, the term "workpiece" refers to a metal body being produced using solid free form fabrication.

The term "design model" as used herein refers to any known or conceivable virtual three-dimensional representation of the object that is to be formed which can be employed in the control system of the arrangement according to the second aspect of the invention: to regulate the position and movement of the holding substrate and to operate the welding torch with integrated wire feeder such that a physical object is built by fusing successive deposits of the metallic material onto the holding substrate in a pattern which results in building a physical object according to the virtual three-dimensional model of the object. This may, for instance, be obtained by forming a virtual vectorized layered model of the three-dimensional model by first dividing the virtual three-dimensional model into a set of virtual parallel layers and then dividing each of the parallel layers into a set of virtual quasi one-dimensional pieces. Then, the physical object can be formed by engaging the control system to deposit and fuse a series of quasi one-dimensional pieces of the metallic material feed onto the supporting substrate in a pattern according to the first layer of the virtual vectorized layered model of the object. Then, repeating the sequence for the second layer of the object by depositing and fusing a series of quasi one-dimensional pieces of the weldable material onto the previous deposited layer in a pattern according to the second layer of the virtual vectorized layered model of the object. Repetition continues the deposition and fusing process layer by layer for each successive layer of the virtual vectorized layered model of the object until the entire object is formed. However, the invention is not tied to any specific design model and/or computer software for running the control system of the arrangement according to the invention, and nor is the invention tied to any specific type of control system. Any known or conceivable control system (CAD-model, computer software, computer hardware and actuators etc.) able to build metallic three-dimensional objects by additive manufacture can be used. In two torch systems, the control system can be adjusted to separately operate a first PTA-torch to preheat or form a molten pool on a substrate and a second PTA-torch to melt the feed wire of metallic material into the preheated area or molten pool.

B. Fluid-Cooled Melting Tool

Provided herein is a fluid-cooled melting tool that includes a dual circuit cooling design. One circuit directs a cooling fluid in the vicinity of the heating element of the melting tool, such as an electrode or nozzle or both of a PTA torch. Another coolant circuit directs a separate cooling fluid to other areas of the melting tool, such as about the circumference of the tool, to remove additional residual thermal energy from the melting tool, such as the jacket of the melting tool. The fluid-cooled melting tool allows increased throughput and yield of products produced via additive manufacturing without the risk of frequent downtime due to overheating of the melting tool. Because the fluid-cooled melting tool removes thermal energy from the vicinity of the thermal region of the melting tool, such as an electrode of the PTA torch, as well as other areas of the melting tool, such as a jacket of the melting tool, a higher flow rate of electric charge can be used than in traditional melting tools, which can result in increased production rates of products formed by additive manufacture due to the deposition of more metal from the consumable electrode onto the base material forming the workpiece at a faster rate. The fluid-cooled melting tool can utilize a wide range of current, such as 200-400 amps or more. The current can be pulsed or non-pulsed.

The fluid-cooled melting tool typically is a PTA torch, although the dual circuit cooling design can be used for other melting tools, including laser melting tools and electron beam melting tools. Subsequent description will refer to the melting tool as a torch. The description, however, also is applicable to other types of melting tools. In the dual circuit fluid cooled melting tools provided herein, a first cooling circuit removes thermal energy in the vicinity of the jacket of the melting tool. A second cooling circuit removes thermal energy in the vicinity of the melter, such as near the orifice from which thermal energy produced by the melter, or near the part of the melter producing thermal energy, such as the electrode, electrode holder, laser generator or electron beam generator.

In additive manufacturing systems that use a PTA torch as a melting tool, the PTA torch acts as power sources to melt metal wire, or metal wire and the substrate, in a controlled environment, such as in an inert atmosphere. Such torches typically include an electrode surrounded by a constricting nozzle which also protects the electrode. Plasma gas (which typically is argon) is fed along an electrode (which typically is tungsten) in order to initiate the arc (ionization by high frequency ignition) and to maintain the arc by a continuous supply of fresh gas to be ionized. Separate arcs originating from a single torch can be used to separately melt the wire and the substrate. The energy input can be managed by careful control of the plasma transferred arc currents together with the plasma gas flow rates. When two plasma torches are used, a more precise control over the energy input to the substrate can be achieved.

High throughput near net-shape deposition through additive manufacturing processes require stable and repeatable plasma transferred arc (PTA) characteristics over a wide range of current (200-400 A, pulsed and non-pulsed) and plasma gas flow inputs. The additive manufacturing process requires the torches to handle very high temperatures without degrading. In order to provide torches that can handle very high operating temperatures, provided herein are torches that include special cooling circuits. Because of the design of the dual circuit cooling design of the fluid-cooled torches provided herein, quick and dry electrode and nozzle replacement easily can be performed. The dual circuit cooling design also allows for a heavy duty industrial design, a much thinner profile than other PTA torches, and has demonstrated low maintenance and less down time than conventional torches. The torches provide consistent energy transfer characteristics, which result in repeatable additive manufacture over time and over different machines. The torches provided herein can consistently generate high quality melt pools, and have demonstrated production of precise plasma arc shape. The torches provided herein exhibit production of low deflection plasma arc, and the capability of working at high current at 100% duty cycle. The increased cooling capacity achieved by the dual circuit cooling design allows increased duration of continuous operation. The design of the dual circuit cooling design (with dual circuit meaning one cooling circuit for torch, which can remove thermal energy from the nozzle and/or electrode and/or power cable, and one cooling circuit for the torch jacket) eliminates any chance of coolant leakage when changing consumables. The cooling design can be configured so that coolant does not surround the electrode directly. In some configurations, the cooling design positions the cooling channels or a cooling chamber or both in the vicinity of the electrode. In some configurations, the cooling design positions the cooling channels or a cooling chamber or both in the vicinity of the electrode holder. The cooling design provided herein allows for a dry electrode replacement.

The fluid-cooled melting tools provided herein can include fluid-cooled power cables, obviating the use of bulky cables conventionally used. The fluid-cooled power cables are flexible and enable free and very precise axis movement of the torch. When the power transfer cables are fluid-cooled, the diameter of the cable can be reduced while allowing the cable to carry the same amount of current at the same voltage. Thinner cables are flexible and when used in the cable chain allow for enhanced tool movement in additive manufacturing machine.

The fluid-cooled melting tools having a dual circuit cooling system provided herein are particularly useful for use in additive manufacturing processes. The fluid-cooled melting tools provided herein can be PTA torches that have current capacity of no less than 400 A at 100% duty cycle even at low inert gas flows (as low as 3.0 Norm Liters per minute (NL/min)). The body of the fluid-cooled melting tool has been streamlined so that it has a slim body, which allows for easy arrangement of multiple torches in a system. In some configurations, the body has a width of less than 100 mm, or less than 90 mm, or less than 80 mm, or less than 70 mm, or less than 60 mm, or less than 50 mm, or less than 40 mm.

The fluid-cooled melting tools provided herein are particularly suited for use in a two torch additive manufacturing system. Because of the dual circuit cooling system of the fluid-cooled melting tools provided herein, when configured as PTA torches, the current working range is from about 10 A to about 400 A with a peak energy delivery in excess of 14 KW at 100% duty cycle without any performance degradation. Because the fluid-cooled melting tools provided herein can carry higher current capacities, higher metal deposition rates can be achieved and productivity rates for producing near-net shape metal objects can be increased.

The overall shape and weight of the dual circuit cooled melting tool configured as a PTA torch are optimized to provide a slim design with a high current capacity The material choice, such as titanium or titanium alloy for parts of the melting tool, and the presence of the dual circuit cooling design, enables a minimum service life of over 1000 hours of arc on-time at maximum load.

The fluid-cooled melting tools configured as PTA torches support delivery of pulsed currents with a frequency of 0 to 2.5 KHz, such as 0.001 to 2.5 KHz. The fluid-cooled torches provided herein produce stable arcs with deflection of no more than 0.2 mm, and this stability can be maintained for currents ranging from 100 A to 400 A. The fluid-cooled torches provided herein also have demonstrated consistent energy transfer characteristics.

Figure 1A:
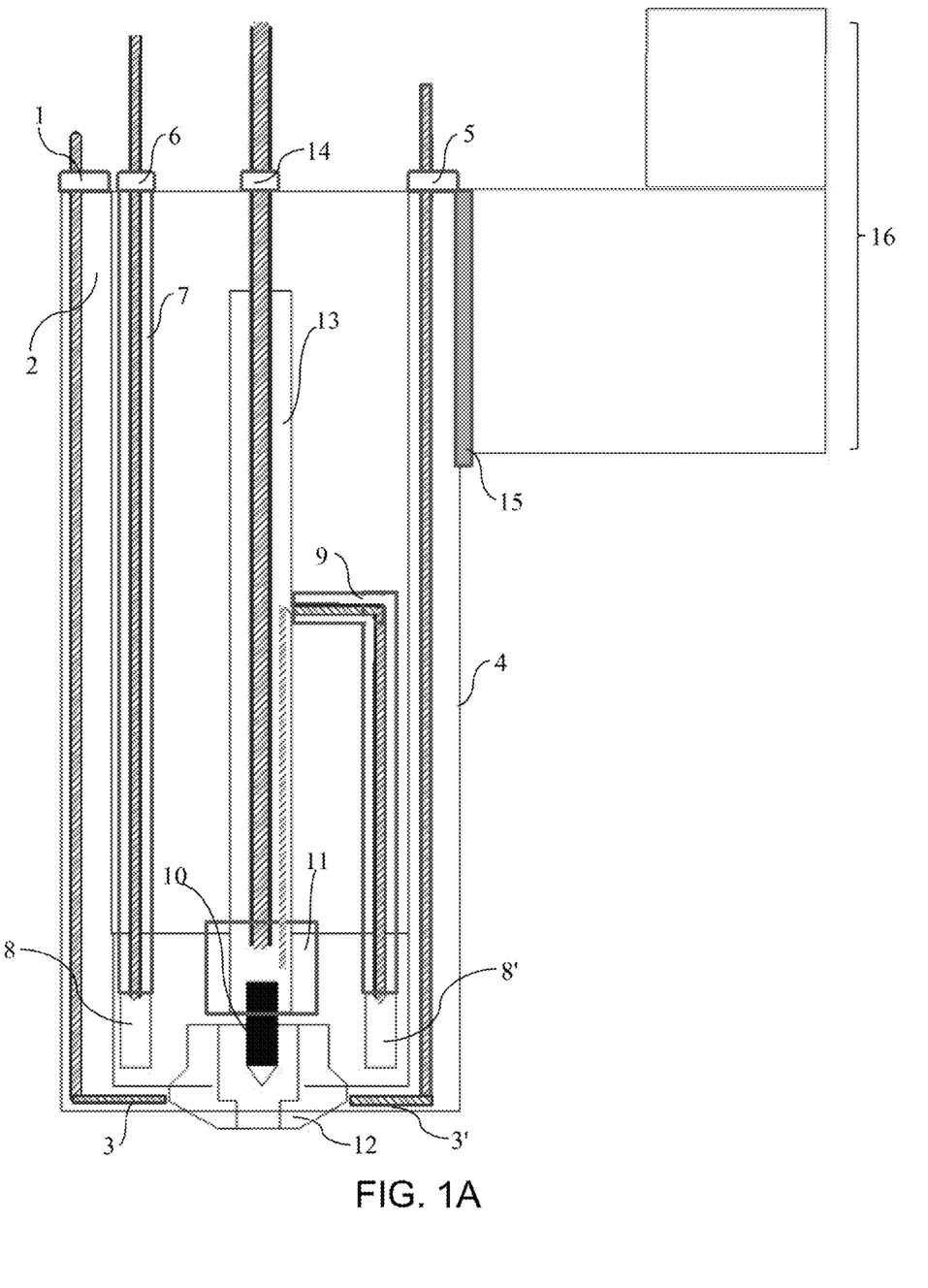
FIG. 1A is a side cross-sectional view of an embodiment of the cooled melting tool provided herein.
Figure 1B:
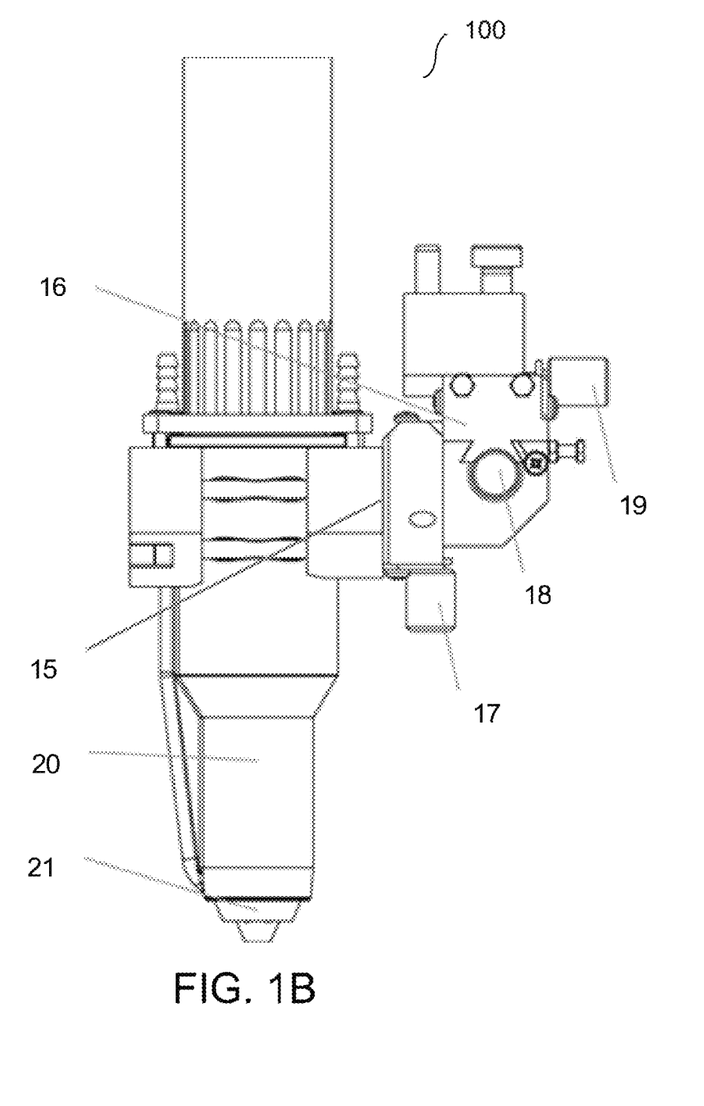
FIG. 1B is a side view of an embodiment of the cooled melting tool provided herein.
Figure 1C:
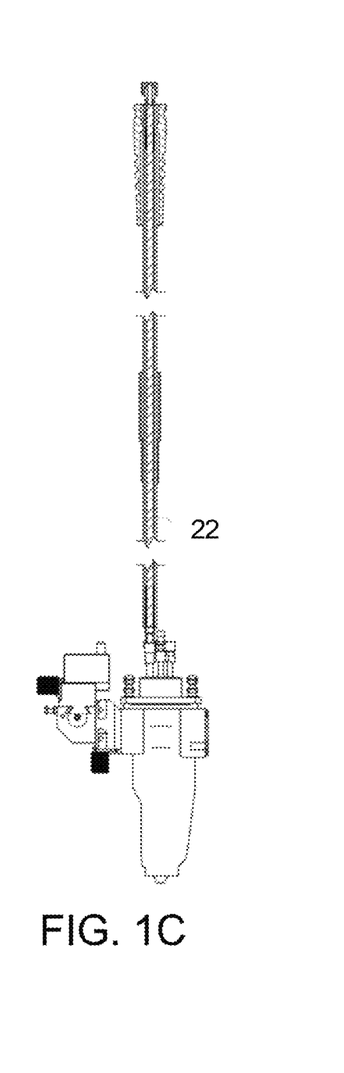
FIG. 1C is a schematic representation of an embodiment of the cooled melting tool provided herein with an exemplary fluid cooled electric cable.

An exemplary embodiment of the fluid-cooled torch configured as a PTA torch 100 is shown in FIGS. 1A through 1C. As shown in FIG. 1B, the torch 100 can include a jacket 20, a shielding gas outlet 21, a torch adjustment connector 16 and an isolation material 15 between the torch jacket 20 and the torch adjustment connector 16. The 3-axis adjustment connector 16 allows for mechanical adjustment of the torch body thereby enabling precise positioning and control over electrode direction in the end arc direction. The 3-axis adjustment connector 16 can include three screws 17, 18, and 19 that separately can move the torch along the Z-axis, X-axis, and Y-axis, respectively. The fluid-cooled torches provided herein can include a fluid-cooled power cable 22, as illustrated in FIG. 1C. The power cable can be of any standard design tailored to fit within a fluid-tight outer sheath, which forms a channel between the outer sheath and the cable, the channel filled with a cooling fluid and allowing the cooling fluid to flow around the power cable to absorb thermal energy therefrom and pumped away from the torch to remove the thermal energy of the power cable. In the embodiment illustrated in FIG. 1C, the fluid-cooled cable 22 to the plasma torch is mounted on an axis to allow for flexible movement of the power cable without any mechanical strain on the torch or arc. The fluid-cooled power cable 22 also can be configured to provide coolant or cooling fluid to the cooling circuits of the torch.

Two torch welding systems are known, such as described in international patent application publication WO 2012/134299 (Stempfer, 2012). In typical two torch systems, a first torch preheats a work piece, which makes the workpiece more receptive to molten metal, and a second melting tool that is a main melting tool that produces a main PTA heats and melts a metal wire from a wire feed, forming droplets of molten metal that drop into and form a melt pool and ultimately after cooling form the deposited layer of molten metal.

The fluid-cooled torches provided herein can include a constricting nozzle. The constricting nozzle is designed to constrict the arcs, maintaining desired arc shape even at low plasma gas flow rates. The nozzle outlet diameter and internal shape is optimized to keep a curtain of non-ionized gas, which can provide an added layer of protection of the nozzle from overheating in addition to protection achieved via the cooling channel of the nozzle cooling circuit.

Figure 2:
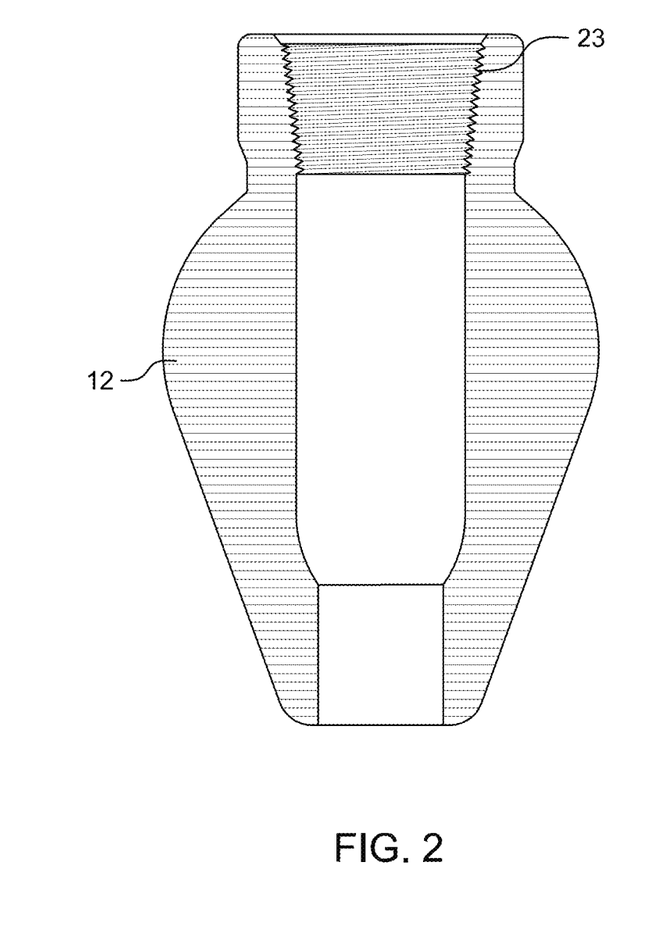
FIG. 2 is a schematic representation of cross-sectional view of an exemplary constricting nozzle.

An exemplary nozzle design is illustrated in FIG. 2, although other nozzle designs can be used with the dual circuit cooling design provided herein. The exemplary constricting nozzle 12 depicted in FIG. 2 includes a conical interface 24. The conical interface 24 not only minimizes or eliminates the positioning error than can occur during threading of the nozzle 12 on to a nozzle holder, the conical interface 24 provides a defined stop, ensuring proper connection and seating of the nozzle. The conical interface 24 also can provide a good contact for heat and electrical conductivity. The combination of nozzle design and the temperature reduction achieved using the dual circuit cooling design provided herein allows the nozzle to perform up to 4 hours of continued operation without degradation. The diameter of the exit of the nozzle can be optimized such that a layer of non-ionized gas is provided between the hot plasma and the nozzle so that the transferred arc plasma does not touch the nozzle surface, thereby increasing the lifetime of the nozzle. The PTA torch has an arc pressure that produces a soft arc that does not disturb the weld pool. The diameter of the exit of the nozzle can be in a range of from about 3 mm to about 10 mm, or from about 4 mm to about 6 mm, or from about 4 mm to about 5 mm.

The nozzle can be or comprise any material appropriate for the welding conditions typically present during additive manufacturing. The nozzle can comprise copper or copper alloy. The copper alloy can contain any of copper ASTM Classes II through X. The copper alloy can include copper in combination with Ag, Al, Be, Bo, Cr, In, Mg, Ni, Sn, Sr, Te, W, Zn or Zr or combinations thereof. In some applications, the nozzle comprises a CuTeP alloy. The invention is not tied to any specific choice or type of nozzle. Other nozzles also can be used. Any known or conceivable device able to function as a nozzle of a PTA torch can be used.

Figure 3:
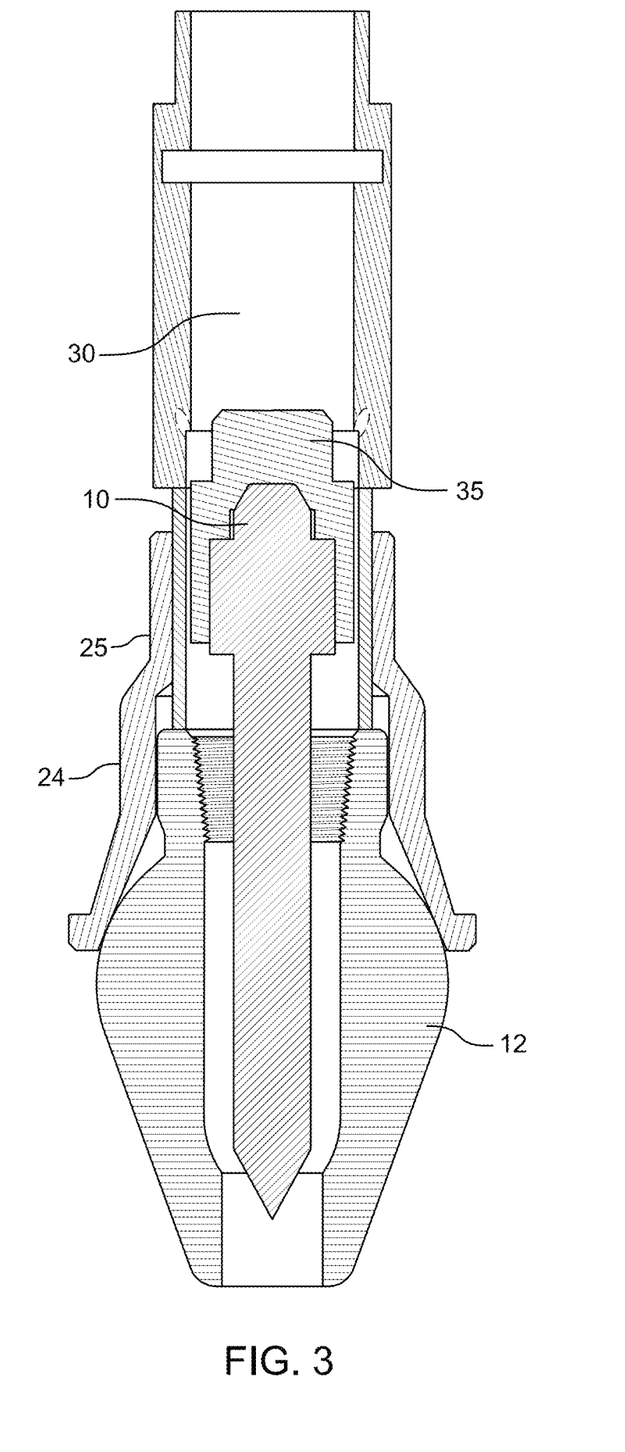
FIG. 3 is a side cross-sectional view of a schematic representation illustrating the nozzle, nozzle holder, electrode and electrode holder.

The fluid-cooled torches provided herein can include an electrode. An exemplary electrode configuration is illustrated in FIG. 3. FIG. 3 is a side cross-sectional view of a schematic representation illustrating the nozzle, nozzle holder, electrode and electrode holder. The electrode 10 can include a conical interface 35 at the base of the electrode 10. The conical interface 35 not only minimizes or eliminates the positioning error that can occur during threading of the electrode on to the electrode holder 30, the conical interface 35 provides a defined stop, ensuring proper connection and seating of the electrode 10. The conical interface 24 of nozzle 12 provides a defined stop, ensuring proper connection and seating of the nozzle 12 on to the nozzle holder 25. The conical interface 24 of nozzle 12 also can minimize or eliminate the positioning error that can occur during threading of the nozzle 12 on to the nozzle holder 25. The conical interface 24 and the conical interface 35 also can provide good contact for heat and electrical conductivity.

The electrode can be or comprise any material appropriate for the welding conditions typically present during additive manufacturing. The electrode can comprise tungsten or a tungsten alloy. The tungsten alloy can include copper. The electrode can comprise tungsten disulfide. The invention is not tied to any specific choice or type of electrode. Other types of electrodes also can be used.

Figure 4A:
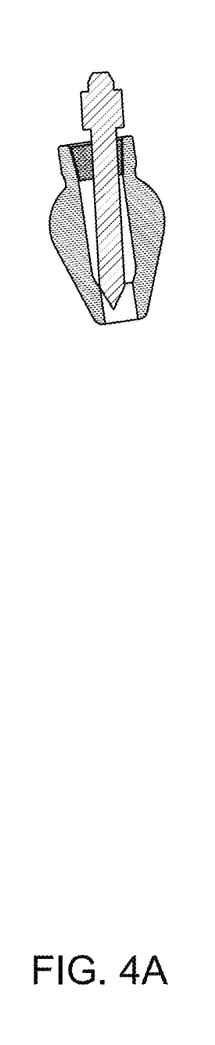
FIGS. 4A-4E are schematic representations illustrating internal and external pose, concentricity, and electrode setback.
Figure 4B:
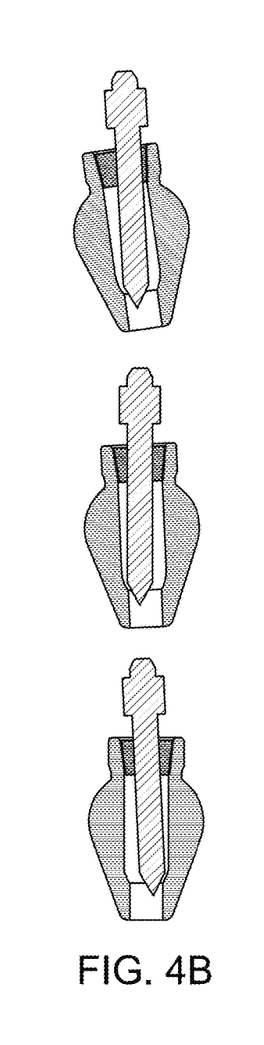
Figure 4C:
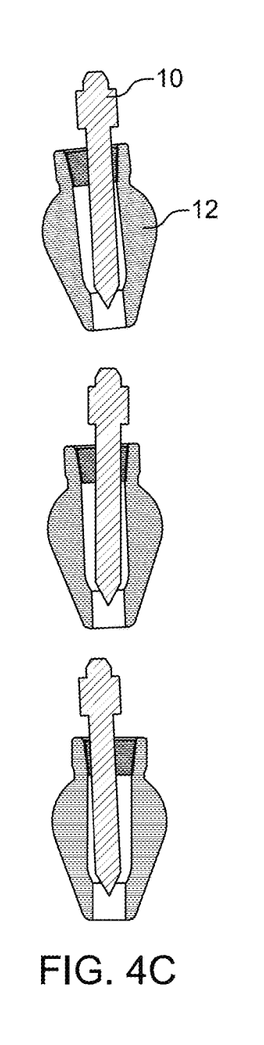
Figure 4D:
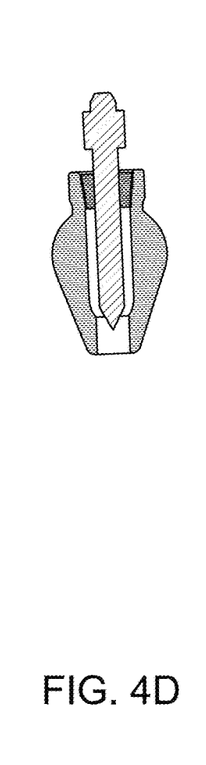
Figure 4E:
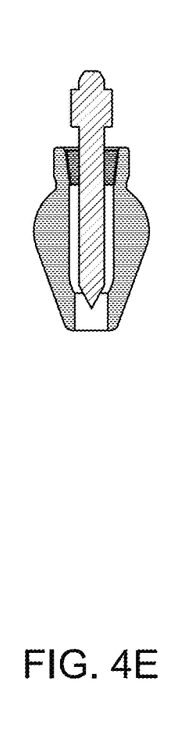

The internal design of the electrode, electrode holder, nozzle and nozzle holder of the fluid-cooled torches provided herein, including the conical interfaces described above, help to promote precise setting of the electrode pose, setback, and concentricity of the electrode with respect to the constricting nozzle. Errors in these characteristics are shown schematically in FIGS. 4A-4D. FIG. 4A illustrates a combination of the electrode and the nozzle where there is bad electrode setback, bad concentricity, bad internal pose and bad overall pose. FIG. 4B illustrates a combination of the electrode and the nozzle where there is good electrode setback, but bad concentricity, bad internal pose and bad overall pose. FIG. 4C illustrates a combination of the electrode and the nozzle where there is good electrode setback and good concentricity, but bad internal pose and bad overall pose. FIG. 4D illustrates a combination of the electrode and the nozzle where there is good electrode setback, good concentricity, and good internal pose, but bad overall pose. FIG. 4E illustrates a combination of the electrode and the nozzle where there is good electrode setback, good concentricity, good internal pose and good overall pose. The combination of electrode design and the temperature reduction achieved using the dual circuit cooling design provided herein allows the electrode to perform up to 4 hours of continued operation without degradation.

The fluid-cooled torch provided herein can include an external body. The torch external body can be or comprise any material appropriate for the welding conditions typically present during additive manufacturing. The external body can comprise titanium or a titanium alloy. The external body can be made of or comprise a Ti alloy containing Ti in combination with one or a combination of Al, V, Sn, Zr, Mo, Nb, Cr, W, Si, and Mn. The jacket can be made of or comprise Ti-6Al-4V, Ti-6Al-6V-2Sn, Ti-6Al-2Sn-4Zr-6Mo, Ti-45Al-2Nb-2Cr, Ti-47Al-2Nb-2Cr, Ti-47Al-2W-0.5Si, Ti-47Al-2Nb-1 Mn-0.5W-0.5Mo-0.2Si, or Ti-48Al-2Nb-0.7Cr-0.3Si. The jacket can be made of or comprise Ti-6Al- 4V alloy. In some configurations, the external body is made from or comprises a titanium alloy so that the external body is lightweight and able to withstand the heat generated during the additive manufacturing process. The 3-axis adjustment connecter and the internals of the fluid-cooled torch provided herein are made of multiple materials.

The external body can be configured to include a torch jacket. An exemplary configuration is shown in FIG. 1B. The torch jacket 20 is positioned near the heat generating end of the torch. The torch jacket 20 can be of the same or different material as the rest of the external body of the torch. In some configurations, the torch jacket 20 is titanium or titanium alloy. The jacket can be made of or comprise a Ti alloy containing Ti in combination with one or a combination of Al, V, Sn, Zr, Mo, Nb, Cr, W, Si, and Mn. The jacket can be made of or comprise Ti-6Al-4V, Ti-6Al-6V-2Sn, Ti-6Al-2Sn-4Zr-6Mo, Ti-45Al-2Nb-2Cr, Ti-47Al-2Nb-2Cr, Ti-47Al-2W-0.5Si, Ti-47Al-2Nb-1Mn-0.5W-0.5Mo-0.2Si, or Ti-48Al-2Nb-0.7Cr-0.3Si. The jacket can be made of or comprise Ti-6Al-4V alloy.

The external torch jacket can be isolated from the torch body and thus the risk of flashover can be reduced. The three-axis adjustment connector 16 can be electrically and/or thermally separated from the torch by using an isolation material 15 in the contact area between the three-axis adjustment connector 16 and the torch. Isolation material 15 can be selected so that they do not readily transfer thermal energy or electrical energy. Exemplary materials that can be used for isolation material 15 include ceramics and plastics. Exemplary ceramics include the oxides or nitrides of Al, B, Zr, Mg, Y, Ca, Si, Ce, In and Sn and combinations thereof (e.g., see U.S. Pat. No. 6,344,287 (Celik et al., 2002); U.S. Pat. No. 4,540,879 (Haerther et al., 1985); and U.S. Pat. No. 7,892,597 (Hooker et al., 2011)). An exemplary plastic insulating material is polyetheretherketone (PEEK). The torch body can be isolated from torch jacket and the jacket can be isolated from the 3-axis adjustment connector that is connected to the tool. The jacket can be configured so that it floating, or electrically isolated from the rest of the machine. In such configurations, the jacket has a separate electrical potential. In a two torch setup using torches configured so that the external torch jacket is floating, there cannot be flashovers.

The torch jacket contains a jacket cooling circuit. The jacket cooling circuit can include a coolant inlet, a coolant outlet and a coolant circuit that allows a flow of a cooling fluid from the coolant inlet toward the vicinity of the jacket adjacent to the nozzle and then to coolant outlet. The flow of cooling fluid through the jacket cooling circuit allows the cooling fluid to absorb and remove thermal energy from the areas in thermal communication with the jacket cooling circuit. The coolant inlet and the coolant outlet are in fluid communication via coolant channels that allow cooling fluid to flow from coolant inlet, through and/or around the torch jacket, and after absorbing thermal energy, the cooling fluid exits the torch jacket via the coolant outlet. In some configurations, the coolant channels can be positioned in the vicinity of the electrode to remove thermal energy from the region of the torch. In some configurations, the coolant channels can be configured as chambers in the vicinity of the electrode to remove thermal energy from the region of the torch.

Reference is made to FIG. 1A. The hashed lines highlight the dual cooling circuits. In operation, a cooling fluid flows through torch jacket coolant inlet 1. The cooling fluid migrates downward through jacket cooling fluid channel 2 then to jacket cooling fluid channel 3 toward the hottest part of the jacket, which typically is in the vicinity of the constricting nozzle 12. The cooling fluid absorbs thermal energy, and the warmed cooling fluid flows from cooling fluid channel 3' up through cooling fluid channel 4 to outgoing torch jacket coolant outlet 5. Torch jacket coolant inlet 1 is connected to a coolant supply outlet, and the torch jacket coolant outlet 5 is connected to coolant supply inlet, such as an inlet to a refrigeration device that can remove thermal energy from the warmed cooling fluid, rendering the cooling fluid ready to be used and sent to a coolant supply outlet. To facilitate the absorption or transfer of thermal energy, the jacket cooling circuit can include projections, such as pins or fins or other similar devices which, among other things, can increase surface area contact between the cooling fluid and walls of the jacket cooling circuit.

Any suitable cooling fluid appropriate for the temperatures expected to be encountered within the torch jacket can be used. Exemplary cooling fluids include water, a $C_1$-$C_5$ alcohol, a polyalphaolefin, an alkylene glycol, such as ethylene glycol or propylene glycol, or mixtures thereof. In some embodiments, the cooling fluid is water, a mixture of water and propylene glycol, or a mixture of water and ethylene glycol. The cooling fluid can include additives, such as salts, corrosion inhibitors, pH adjusters or combinations thereof. The cooling fluid has a specific heat and the mass flow rate can be modulated to achieve an efficient cooling of torch jacket 20. The flow rate of the cooling fluid in the jacket cooling pathway can be in a range from about 0.5 L/min to about 5 L/min, or a range from about 1 L/min to about 3 L/min, or a range from about 1 L/min to about 2 L/min. The dual circuit cooling design keeps the outer torch jacket cool even when the torches are being run at 400 A over a prolonged duration of time, when used singly as a single torch or when used in combination, such as in a two torch system.

The fluid-cooled torches provided herein include a shielding gas outlet. An exemplary shielding gas outlet 21 is depicted in FIG. 1B. A shielding gas is used to prevent oxidation of the metal during fabrication. Shielding gas is provided to the shielding gas outlet 16 via a shielding gas connection (not shown).

In some applications, the additive manufacturing processes provided herein are performed in an enclosed chamber filled with an inert gas. The inert gas can be or include argon, helium, xenon, krypton or neon or combinations thereof. In some applications, the inert gas is argon, or a combination of argon with another noble gas. For example, in some applications, the entire process is performed in an enclosed argon-filled chamber. When the PTA torch operates in an enclosed argon-filled chamber, a shielding gas theoretically is not required. For the fluid-cooled torches provided herein, it has been determined that the shielding gas outlet can be configured to provide a curtain of non-ionized plasma gas around the arcs, and that doing so can help to stabilize the arcs. The shielding gas outlet can reduce arc flickering and can help to maintain the desired arc shape.

The fluid-cooled torches provided herein include a torch cooling circuit. The torch cooling circuit includes a coolant inlet in fluid communication with a coolant outlet via a coolant pathway. The torch cooling circuit also includes a nozzle cooling chamber. The torch cooling circuit also includes an electrode cooling chamber. The coolant pathway includes a channel that can provide fluid communication between the coolant inlet and the nozzle cooling chamber, or a channel that can provide fluid communication between the coolant inlet and the electrode cooling chamber. The coolant pathway includes a channel that can provide fluid communication between the nozzle cooling chamber and the coolant outlet, or a channel that can provide fluid communication between the electrode cooling chamber and the coolant outlet.

The coolant pathway can include a channel that can provide fluid communication between the coolant inlet and the nozzle cooling chamber, and a channel that provides fluid communication between the nozzle cooling chamber and the electrode cooling chamber, and a channel that provides fluid communication between the electrode cooling chamber and the coolant outlet. The coolant pathway can include a channel that can provide fluid communication between the coolant inlet and the electrode cooling chamber, and a channel that provides fluid communication between the electrode cooling chamber and the nozzle cooling chamber, and a channel that provides fluid communication between the nozzle cooling chamber and the coolant outlet.

The nozzle cooling chamber is located in the vicinity of the nozzle and is in thermal communication with the nozzle. The channels of the coolant pathway of the torch cooling circuit can be configured so that the channels are in the vicinity of the nozzle, or so that a plurality of channels are in the vicinity of the nozzle, and remove thermal energy from the vicinity of the nozzle. Such a configuration of the cooling channels can remove any excess thermal energy in the vicinity of the nozzle.

The electrode cooling chamber is located in the vicinity of the electrode and is in thermal communication with the nozzle. The channels of the coolant pathway of the torch cooling circuit can be configured so that the channels are in the vicinity of the electrode, or so that a plurality of channels are in the vicinity of the electrode, and remove thermal energy from the vicinity of the electrode. Such a configuration of the cooling channels can remove any excess thermal energy in the vicinity of the electrode.

An exemplary torch cooling circuit is illustrated in FIG. 1A. In FIG. 1A, the torch cooling circuit includes a coolant inlet 6, a coolant outlet 14 and coolant channels 7, 9 and 13 that traverse the torch and allows coolant fluid flow from the coolant inlet 6 to the coolant outlet 14. In the configuration illustrated in FIG. 1A, the coolant channel 7 connects the coolant inlet 6 to a coolant circulation chamber 8 (with 8' shown due to the cross-section of the figure) that is in the vicinity of the of the constricting nozzle 12. The coolant channel 9 connects the coolant circulation chamber 8 to coolant circulation chamber 11, which is located in the vicinity of the electrode 10. The coolant channel 13 connects the coolant circulation chamber 11 to the coolant outlet 14, from which warmed coolant exits the circuit.

In operation, a fluid coolant flows through the coolant channels, nozzle coolant circulation chamber 8 and electrode coolant circulation chamber 11, each of which acts as a heat exchanger. The fluid coolant within the coolant channel and circulation chambers absorbs thermal energy from their respective vicinities, and the flow of the coolant through the cooling circuit carries the thermal energy away from the nozzle and electrode areas and ultimately out of the torch via torch cooling outlet 14. The coolant has a specific heat and the mass flow rate can be modulated to achieve an efficient cooling of the nozzle area and electrode area. The flow rate of the fluid coolant can be in a range from about 0.5 L/min to about 5 L/min, or a range from about 1 L/min to about 4 L/min, or a range from about 2 L/min to about 3 L/min.

To facilitate the absorption or transfer of thermal energy, the entry coolant channel can include projections, such as pins or fins or other similar devices which, among other things, can increase surface contact between the cooling fluid and walls of the coolant channel, although such modifications are not required. Torch cooling outlet 14 is connected to an inlet of a refrigeration device that can remove thermal energy from the warmed coolant, rendering the coolant ready to be used and sent to a coolant supply outlet.

Any suitable coolant appropriate for the temperatures expected to be encountered in the vicinity of the electrode area or nozzle area can be used. Exemplary cooling fluids include water, a $C_1$-$C_5$ alcohol, a polyalphaolefin, an alkylene glycol, such as ethylene glycol or propylene glycol, or mixtures thereof. In some embodiments, the coolant is water, a mixture of water and propylene glycol, or a mixture of water and ethylene glycol. The coolant can include additives, such as salts, corrosion inhibitors, pH adjusters or combinations thereof. The dual circuit cooling design of the fluid-cooling melting tools provided herein comprise the torch cooling circuit and the jacket cooling circuit.

C. Methods and Systems

The dual circuit fluid-cooled torches provided herein can be used in methods for manufacturing a three-dimensional work piece of a metallic material by additive manufacture, where the object is made by fusing together successive deposits of the metallic material onto a base material. In preferred embodiments, the dual circuit fluid-cooled torch is used with a system that utilizes two PTA torches, such as described in WO 2012/134299 (Stempfer, 2012). In the methods, a base material of the same metallic material as the object to be made is layered with successive deposits of metallic material, each successive deposit obtained by using a first dual circuit fluid-cooled PTA torch to preheat or form a molten pool in the base material, or both, at the position at which the metallic material is to be deposited, feeding a consumable electrode so that its distal end is positioned above the molten pool, and using a second dual circuit fluid-cooled PTA torch to heat and melt the consumable electrode such that molten metallic material from the consumable electrode drips into the molten pool, and moving the base material relative to the position of the first and second PTA torches in a predetermined pattern such that the successive deposits of molten metallic material solidifies and forms the three-dimensional work piece.

The two torch system makes it possible to increase the heat supply to the consumable electrode independently of the heat supply to the base material. In these configurations, a direct current power source can be connected such that the electrode of the first dual circuit fluid-cooled PTA torch (positioned above the base material to heat the base material or form a molten pool or both) becomes the negative polarity and the base material becomes the positive polarity to define an electric circuit where electric charge is transferred by an arc discharge between the electrode of the first dual circuit fluid-cooled PTA torch and the base material. The negative pole of a direct current power source can be connected to the electrode of the second dual circuit fluid-cooled PTA torch (positioned near the distal end of the consumable electrode exiting the fluid-cooled contact tip assembly) and the positive pole is connected to the consumable electrode to form an electric circuit where electric charge is transferred by an arc discharge between the electrode of the second dual circuit fluid-cooled PTA torch and the consumable electrode. The first and second dual circuit fluid-cooled PTA torches can have the same or separate power sources and can have the same or separate regulators for regulating the power supply to each of the torches independently.

A plasma stream is created by energizing a flowing gas using an arc electrode, the arc electrode having a variable magnitude current supplied thereto. Because the dual circuit fluid-cooled PTA torch provided herein can handle electric current of 400 amps or more while still producing a stable arc, the dual circuit fluid-cooled PTA torch provided herein allows for more flexibility in the deposition process. In additive manufacturing processes, the fluid-cooled melting tools provided herein when configured to be PTA torches, exhibit stable and repeatable plasma transferred arc characteristics over wide range of current including current of from about 10 to 400 amps or more, whether pulsed or non-pulsed. Plasma gas flow inputs also can be varied. The fluid-cooled melting tools provided herein have a slim design that allows multiple melting tools to be used in combination, such as in a two torch system. In the methods provided herein, the fluid-cooled melting tools can be used at an applied current of 400 amps or more at 100% duty cycle and a stable arc still can be produced.

In additive manufacturing methods, the fluid-cooled melting tools provided herein can be PTA torches, and can increase the deposition rate or metallic material during the manufacturing process by supplying the consumable electrode in the form of a wire and using a relatively high flow rate of electric charge to the electrode of the torch, which is achievable because of the cooling the PTA torch with the dual circuit fluid cooling system. The cooling channels can be positioned close to where the heat is generated in the torch. In some embodiments, the cooling channels are located in sufficient proximity to the electrode or the nozzle or the jacket or any combination thereof to allow rapid transfer of thermal energy to the cooling channels and out of the torch to prevent overheating of the torch. The melting tools configured at a PTA torch provided herein include a dual channel cooling, where one channel cools the electrode and the nozzle, and another channel cools the jacket of the melting tool.

Also provided are methods for manufacturing a three-dimensional object of a metallic material by additive manufacturing, where the methods include depositing successive deposits of a metallic material onto a base material. The molten metallic material is produced with a fluid-cooled melting tool provided herein that produces a plasma transferred arc (PTA) by feeding a consumable electrode into a fluid cooled melting tool so that it comes into contact with an electric contact unit that applies a current of 200-400 amps or more to the consumable electrode and positions the tip of the consumable electrode to a position above a target deposition area, and the melted metal is deposited to form the deposit of metallic material. Successive deposits form the near-net shape object. The dual circuit cooling design of the melting tool produces a stable arc and allows selection of a wide current working range, such as from about 10 A to about 400 A.

In some applications, multiple melting tools can be used in combination. For example, a two torch system can be used, in which two melting tools are used in combination. In such methods, each successive deposit can be obtained by using a first PTA to preheat a base material, or to form a molten pool in the base material, or both, at the position at which the metallic material is to be deposited. A consumable electrode in the form of a metal wire is delivered to an electric contact unit that applies a current of 200-400 amps or more amps to the consumable electrode and positions the tip of the consumable electrode to a position above the preheated area or molten pool. A second PTA heats and melts the wire such that molten metallic material drips into the preheated area or molten pool. The base material is moved relative to the position of the first and second PTA in a predetermined pattern such that the successive deposits of molten metallic material solidifies and forms the near-net shape three-dimensional object. In the methods provided, the fluid cooled melting tool includes a cooling system can include a coolant inlet connectable to be in fluid communication with a coolant supply inlet; an incoming coolant channel connected to and in fluid communication with the coolant inlet; an outgoing coolant channel connected to and in fluid communication with the incoming coolant channel; and a coolant outlet connected to and in fluid communication with the outgoing coolant channel.

Also provided are systems for manufacturing a three-dimensional object of a metallic material by additive manufacture. The systems can include a first fluid-cooled welding torch for preheating or forming a molten pool or both in a base material at a position at which the metallic material is to be deposited; a guiding element for guiding a consumable electrode into position above the preheated area or molten pool; an electric contact unit in electrical connection with the consumable electrode to provide a current of 200-400 amps or more to the consumable electrode; a second fluid-cooled welding torch that forms an arc to melt the consumable electrode into the preheated area or molten pool; a system for positioning and moving the base unit relative to the first and second welding torches; and a control system able to a design model of the object which is to be formed and employ the design model to regulate the position and movement of the system for positioning and moving the substrate and to operate the welding torches such that a physical object is built by depositing and fusing successive deposits of the molten metallic material onto the base material. The guiding element or electric contact unit or both can be fluid-cooled. Fluid-cooled electric contact units are described, e.g., in U.S. patent application Ser. No. 15/206,158 (filed Jul. 8, 2016).

The metal wire can be or contain Al, Cr, Cu, Fe, Hf, Sn, Mn, Mo, Ni, Nb, Si, Ta, Ti, V, W, or Zr, or composites or alloys thereof. In some embodiments, the metal wire is a wire that contains Ti or a Ti alloy, or nickel or a nickel alloy. The metal wire used can be a Grade 5 titanium alloy. The diameter of the metal wire, according to certain embodiments of the present invention, can range from about 0.8 mm to about 5 mm. The metal wire can have any practically implementable dimension, e.g., 1.0 mm, 1.6 mm, 2.4 mm, etc. The feed rate and positioning of the metal wire can be controlled and modulated in accord with the effect of the power supply to the PAW torch in order to ensure that the metal wire is being continuously heated and is melted when it reaches the intended position above the preheated area or molten pool in the base material.

A control system (such as a computer-aided manufacturing system) can be simultaneously engaged to operate and regulate the engagement of one or more actuators that constantly positions and moves the base material and one or more PAW or PTA torches such that the intended deposition spot as given by the design model of the object that is to be formed. The control system can also be engaged to operate any actuator controlling a preheating PAW or PTA torch such that a preheated area of the base material, or a molten pool in the base material, is where the melted metallic material is to be deposited.

The control system used in exemplary embodiments of the invention described herein can provide partial or complete automation of the deposition apparatus. The control system can include a computer processor or central processing unit (CPU), CPU display, one or more power supplies, power supply connections, signal modules as inputs and/or outputs, integrated shielding of analog signals, storage devices, circuit boards, memory chips or other storage medium, a non-transitory computer-readable storage medium having a computer-readable program embodied therein, or any combination thereof. The computer-readable program can containing appropriate software for automating any one or combination of systems. Exemplary control modules include, but are not limited to, the SIMATIC-S7-1500 from Siemens AG (Munich, Germany), the IndraMotion MTX system available from Bosch Rexroth AG (Lohr am Main, Germany). And the SIGMATEK C-IPC compact industrial computer system available from SIGMATEK GmbH & Co. KG (Lamprechtshausen, Austria).

It will be apparent to those skilled in the art that various modifications and variation can be made in the present invention without departing from the scope of the invention. Thus, it is intended that the present invention cover the modifications and variations of this invention provided they come within the scope of the appended claims and their equivalents.

REFERENCE SIGNS LIST

The following is a listing of the reference numerals used in the description and the accompanying Drawings.
1 Jacket cooling fluid inlet. Cooling fluid enters and is directed to the hottest area in the jacket and goes back up in a swirl to torch jacket cooling fluid outlet 5
2 Jacket cooling fluid channel
3 Jacket cooling fluid channel near hottest area of jacket
4 Jacket cooling fluid channel
5 Jacket cooling fluid outlet
6 Torch coolant inlet. Coolant enters and is directed down to hottest exposed area in the coolant circulation chamber 8
7 Torch coolant channel
8 Coolant circulation chamber for cooling of constricting nozzle 12. Coolant exits coolant circulation chamber 8 through chamber channel 9 to flow to electrode circulation chamber 11
9 Chamber channel
10 Electrode
11 Electrode circulation chamber. Coolant exits this to the torch coolant outlet 14
12 Constricting nozzle with treads 23 and conical interface 24 for good cooling surface to 11
13 Coolant exit channel
14 Torch coolant outlet
15 Thermal and/or electrical isolation material between torch jacket 20 and the torch three-axis adjustment connector 16
16 Three-axis adjustment connector
17 Z Adjustment nob to move the torch along Z axis (up and down of the paper 2d view)
18 X Adjustment nob to move the torch along X axis (in and out of the paper 2d view)
19 Y Adjustment nob to move the torch along Y axis (left right of the paper 2d view)
20 Torch jacket
21 Shielding gas outlet
22 Coolant-cooled power cable
23 Treads of constricting nozzle
24 Conical interface of nozzle 12
25 Nozzle holder
30 Electrode holder
35 Electrode conical interface
100 Fluid-cooled torch

What is claimed is:

1. A fluid-cooled PTA torch, comprising:
an electrode;
a constricting nozzle;
a torch cooling circuit that is in thermal communication with and removes thermal energy from the electrode and the constricting nozzle;
a jacket on an outer portion of the PTA torch; and
a jacket cooling circuit located in the jacket, the jacket cooling circuit in thermal communication with the constricting nozzle,
wherein the jacket cooling circuit is separate from the torch cooling circuit and removes thermal energy from the constricting nozzle.

2. The fluid-cooled PTA torch of claim 1 further comprising:
a shielding gas inlet; and
a shielding gas outlet.

3. The fluid-cooled PTA torch of claim 2, wherein the torch cooling circuit comprises:
a coolant inlet;
a nozzle cooling chamber having a nozzle coolant intake and a nozzle coolant vent, the nozzle coolant intake connected to and in fluid communication with the coolant inlet, the nozzle cooling chamber filled with a coolant from the coolant inlet and the chamber being positioned to be in thermal communication with the constricting nozzle so that thermal energy from the constricting nozzle can be transferred to the coolant;
an electrode cooling chamber having an electrode coolant intake and an electrode coolant vent, the electrode coolant intake connected to and in fluid communication with the nozzle coolant vent, the electrode cooling chamber filled with the coolant from the nozzle coolant vent and the chamber being positioned to be in thermal communication with the electrode so that thermal energy from the electrode can be transferred to the coolant; and
a coolant outlet connected to and in fluid communication with the electrode coolant vent.

4. The fluid-cooled PTA torch of claim 2, wherein the jacket cooling circuit comprises:
a cooling fluid inlet;
a cooling fluid outlet; and
a cooling fluid circuit in fluid communication with the cooling fluid inlet and the cooling fluid outlet, the jacket cooling circuit directing a cooling fluid from the cooling fluid inlet toward a portion of the jacket adjacent to the constricting nozzle and then upward to the cooling fluid outlet.

5. The fluid-cooled PTA torch of claim 2, wherein the electrode is made of or comprises:
a) W or a W alloy; or b) a tungsten disulfide.

6. The fluid-cooled PTA torch of claim 2, wherein the constricting nozzle is made of or comprises Cu or a Cu alloy that comprises Ag, Al, Be, Bo, Cr, In, Mg, Ni, Sn, Sr, Te, W, Zn or Zr or a combination thereof.

7. The fluid-cooled PTA torch of claim 2, wherein the jacket is made of or comprises:
a) Ti or a Ti alloy containing Ti in combination with one or a combination of Al, V, Sn, Zr, Mo, Nb, Cr, W, Si, and Mn; or
b) Ti-6Al-4V, Ti-6Al-6V-2Sn, Ti-6Al-2Sn-4Zr-6Mo, Ti-45Al-2Nb-2Cr, Ti-47Al-2Nb-2Cr, Ti-47Al-2W-0.5Si, Ti-47Al-2Nb-1Mn-0.5W-0.5Mo-0.2Si, or Ti-48Al-2Nb-0.7Cr-0.3Si.

8. The fluid-cooled PTA torch of claim 1, further comprising a three-axis adjustment connector.

9. The fluid-cooled PTA torch of claim 1, further comprising a coolant-cooled power cable.

10. The fluid-cooled PTA torch of claim 1, wherein at its widest point the PTA torch comprises an outside width of less than 100 mm.

* * * * *